Nov. 11, 1958  J. R. HOLLOWELL ET AL  2,860,004
VEHICLE BODY WITH RETRACTABLE RIGID TOP
Filed Sept. 20, 1954  5 Sheets-Sheet 1

J.R. HOLLOWELL
B.J. SMITH
R.T. BUTLER
INVENTORS

BY

ATTORNEYS

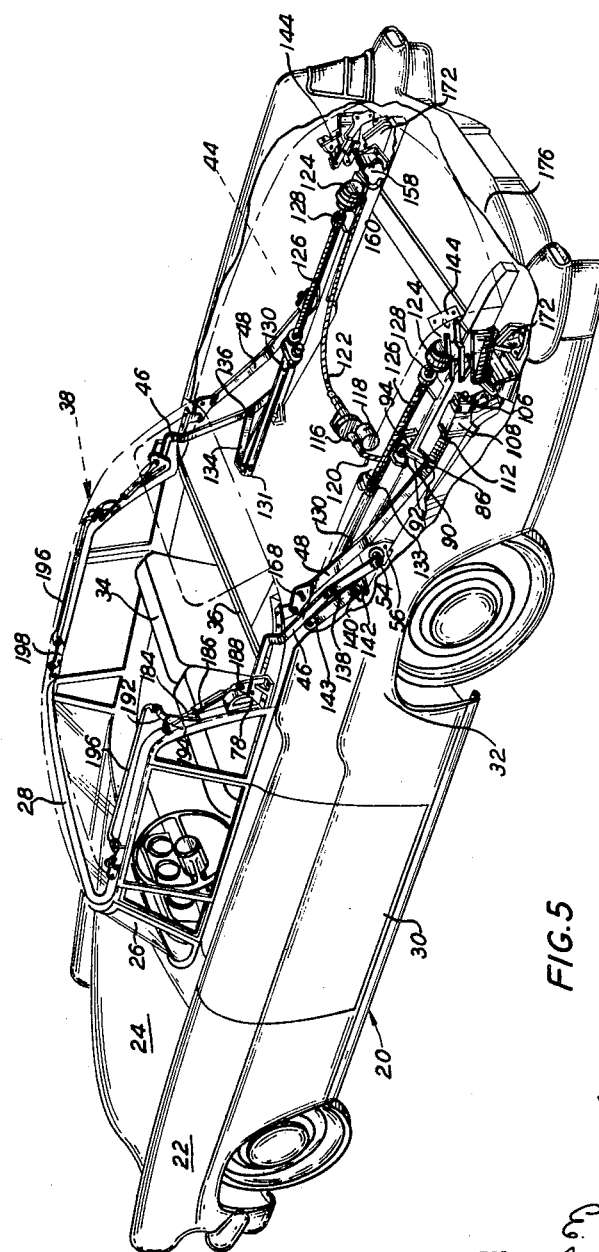

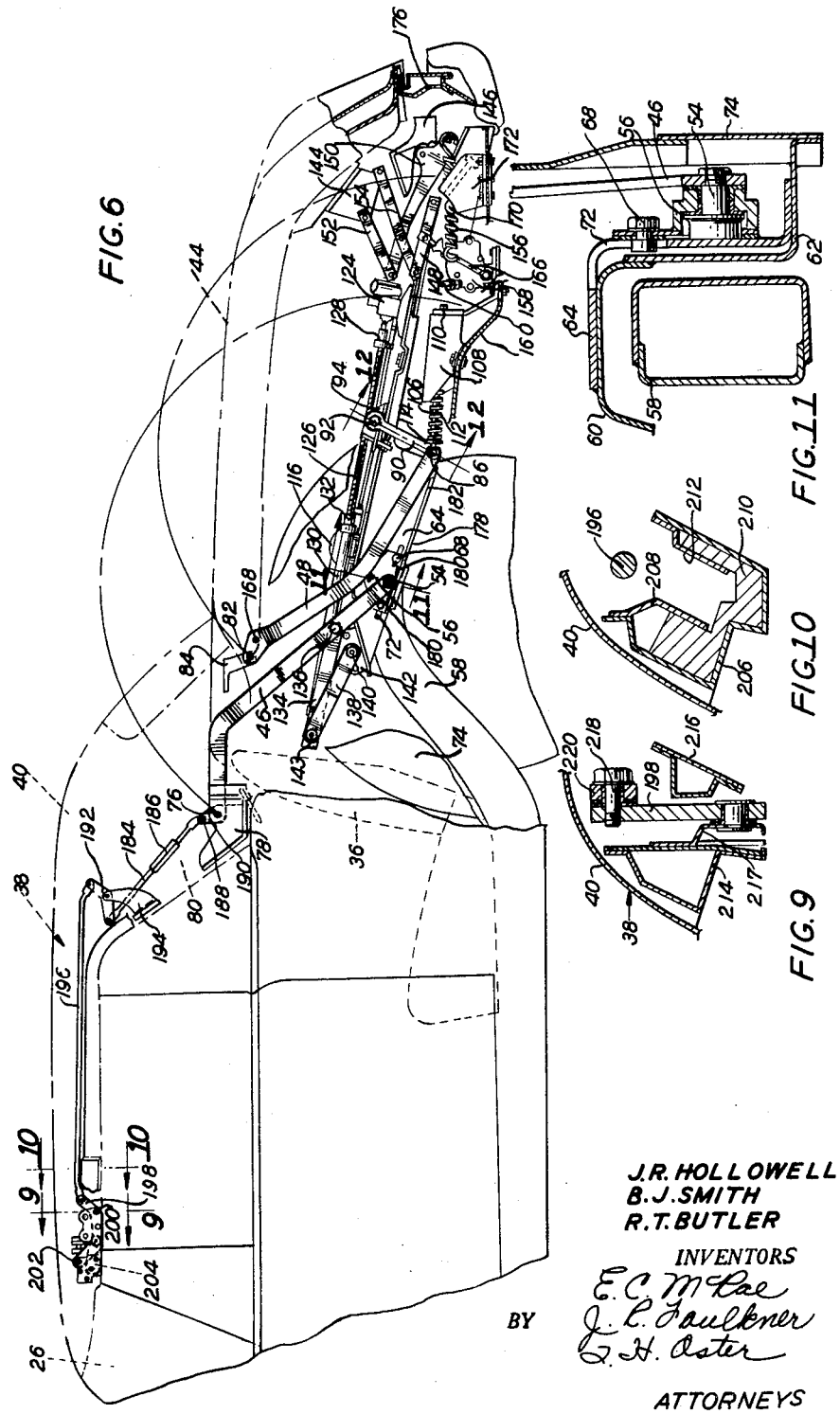

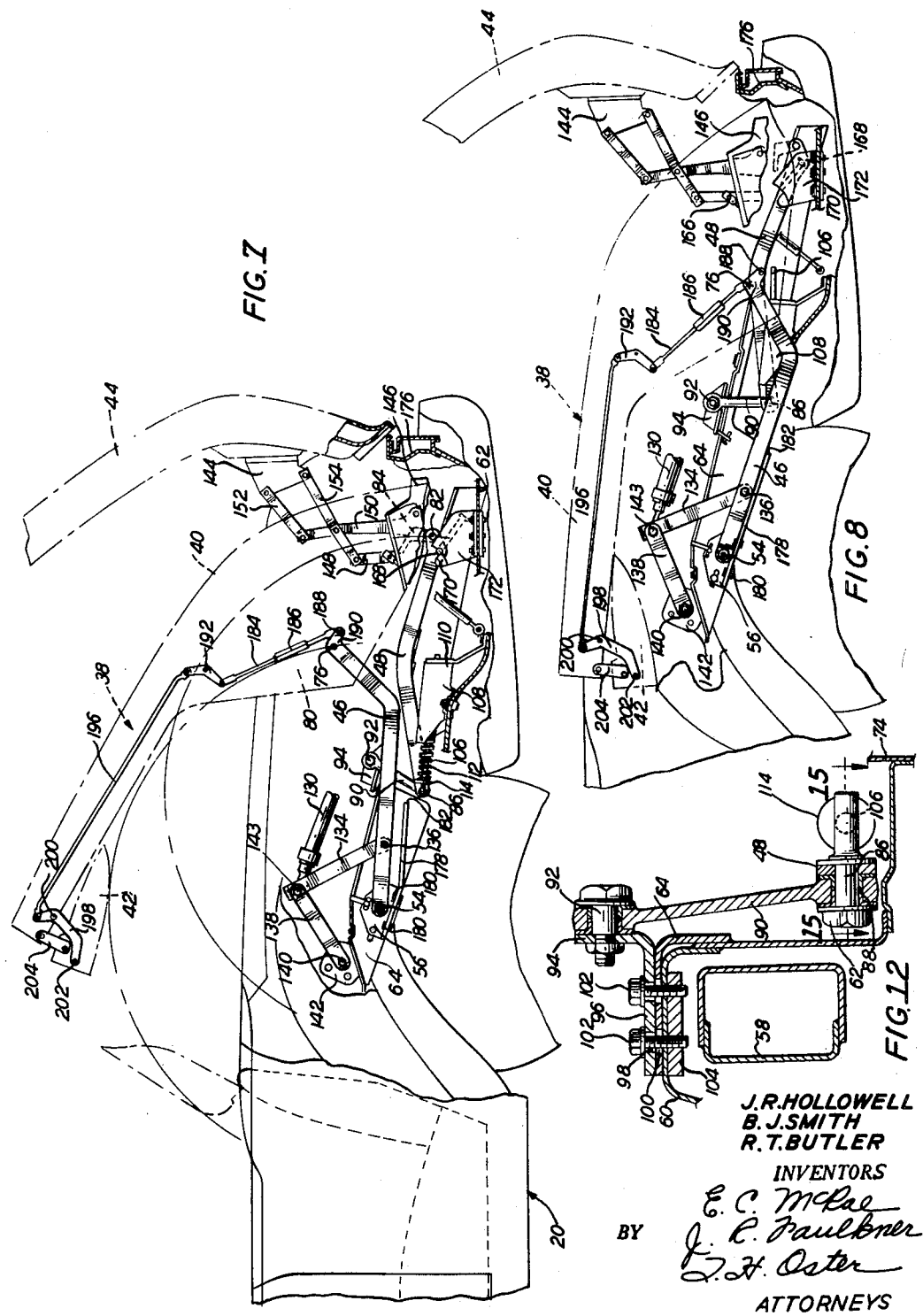

Nov. 11, 1958    J. R. HOLLOWELL ET AL    2,860,004
VEHICLE BODY WITH RETRACTABLE RIGID TOP

Filed Sept. 20, 1954    5 Sheets-Sheet 5

J. R. HOLLOWELL
B. J. SMITH
R. T. BUTLER
INVENTORS

BY E. C. McRae
J. C. Faulkner
B. H. Oster

ATTORNEYS

United States Patent Office 2,860,004
Patented Nov. 11, 1958

2,860,004

VEHICLE BODY WITH RETRACTABLE RIGID TOP

John R. Hollowell, Dearborn, and Ben J. Smith and Roy T. Butler, Detroit, Mich., assignors to Ford Motor Company, Dearborn, Mich., a corporation of Delaware Application September 20, 1954, Serial No. 456,994

17 Claims. (Cl. 296—117)

This invention relates generally to motor vehicle bodies, and has particular reference to a motor vehicle body having a retractable rigid roof.

An object of the present invention is to provide a motor vehicle body having a rigid roof which may be readily lowered and stored within the vehicle body. The invention contemplates a body of the currently popular hard-top convertible type yet in which the roof may be bodily moved from its raised position to a lowered position in which it is stored beneath the rear deck of the vehicle. Means are provided for guiding the roof in a rearward and downward direction to a location immediately beneath the deck lid and simultaneously automatically raising the deck lid in timed relation to the movement of the roof to provide clearance for the entrance of the roof therebeneath.

The roof comprises a main roof section and a smaller forward roof section hingedly connected to the main roof section and interconnected with the operating mechanism therefor so that the forward roof section is folded underneath the forward portion of the main roof section as the latter is retracted, thus providing a compact unit which may be stored within the available space under the rear deck lid. Full utilization of the space beneath the deck lid is also enhanced by providing a longitudinally moveable fulcrum for one of the links supporting and guiding the roof, with the fulcrum being held in a predetermined position throughout the major portion of the retractile movement of the roof yet moveable rearwardly during the final closing movement of the roof to permit the rearward portion of the roof to be moved longitudinally to its final position closely adjacent the generally vertical stationary back body panel located beneath the rear deck lid. Guide means are also provided engageable with the roof linkage during this final movement to accurately locate the rearward portion of the roof and prevent interference with other vehicle components.

The structure of the present invention is particularly designed to provide a relatively simple trouble-free mechanism maintaining the roof and the rear deck lid under positive and accurate control at all times, resulting in a smoothly operating practical construction. Balanced compactly arranged power means are provided to actuate the roof sections and the deck lid in timed relationship automatically. The construction enables a full size roof to be properly stored beneath a rear deck lid of conventional size, resulting in a motor vehicle body of attractive styling and trim appearance.

Other objects and advantages of this invention will be made more apparent as this description proceeds, particularly when considered in connection with the accompanying drawings, wherein:

Figure 5 is an enlarged perspective view of the motor vehicle shown in Figures 1 to 4 inclusive, with the rearward portion of the body partly broken away and with the roof and rear deck lid indicated in phantom to more clearly shows the mechanism therefor.

Figure 6 is a fragmentary enlarged semidiagrammatical side elevational view of a portion of the vehicle shown in Figures 1 to 5 inclusive, with certain parts thereof broken away and others indicated in phantom to more fully illustrate the mechanism.

Figure 7 is a view similar to a portion of Figure 6, but showing the parts thereof in a partially lowered position similar to that shown in Figure 2.

Figure 8 is a view similar to Figures 6 and 7 but showing the parts of the mechanism in a still further lowered position near the final stored position of the roof.

Figure 9 is an enlarged transverse cross sectional view taken on the plane indicated by the line 9—9 of Figure 6.

Figure 10 is an enlarged cross sectional view taken on the plane indicated by the line 10—10 of Figure 6.

Figure 11 is an enlarged cross sectional view taken on the plane indicated by the line 11—11 of Figure 6.

Figure 12 is an enlarged cross sectional view taken on the plane indicated by the line 12—12 of Figure 6.

Figure 2:
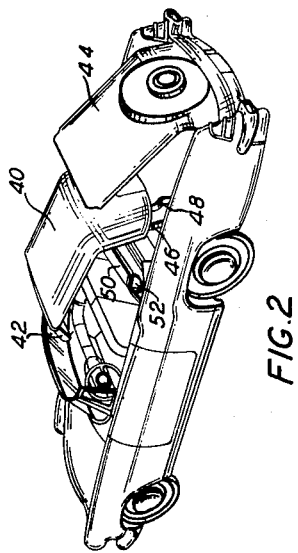
Figure 2 is a perspective view similar to Figure 1, but showing the roof in a partially lowered position.
Figure 4:
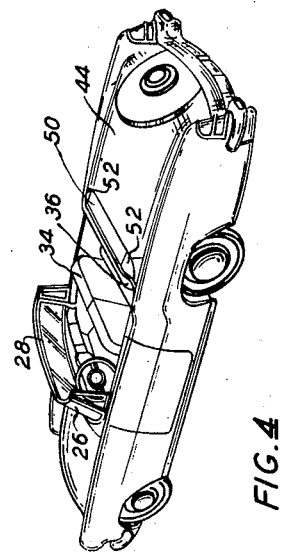
Figure 4 is a perspective view with the roof in its completely lowered or stored position beneath the deck lid.
Figure 1:
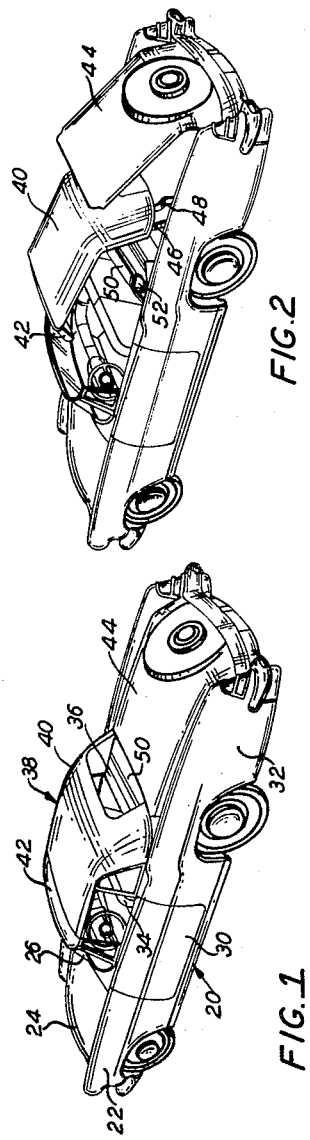
Figure 1 is a perspective view of a motor vehicle incorporating the present invention, with the roof in its raised position.
Figure 3:
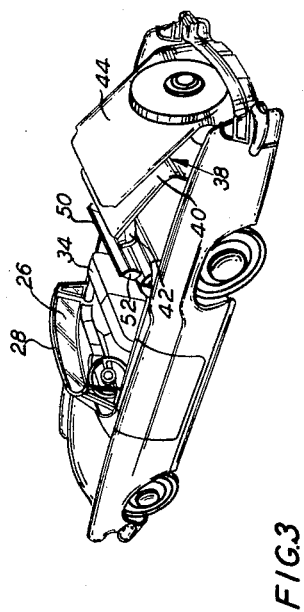
Figure 3 is a perspective view similar to Figure 2, but showing the roof in a still further lowered position.
Figure 15:
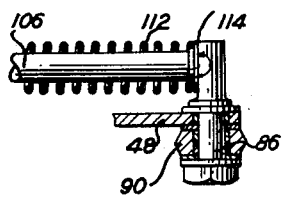
Figure 15 is a cross sectional view taken on the plane indicated by the line 15—15 of Figure 12.

Referring now to the drawings, and particularly to Figures 1 to 4 inclusive, the reference character 20 indicates generally a motor vehicle body incorporating the present invention. The body is somewhat similar to a convertible in that the roof is retractable and is stored within the body, but is also similar to the so-called hardtop convertible in that the roof is a rigid steel structure. The body includes front fenders 22, a hood 24, a curved windshield 26, and a fixed windshield header 28. The side doors 30 and the rear quarter body panels 32 are conventional, as are the front and rear seats 34 and 36 respectively. The roof 38, however, differs from the conventional convertible or hard-top in that it is a rigid steel roof having a main roof section 40 and a smaller forward roof section 42 moveably supported and guided upon the vehicle body in such manner as to be retractable from the raised position shown in Figure 1 to the closed position shown in Figure 4 in which the roof 38 is completely stored beneath the rear deck lid 44.

As will be described more in detail hereinafter, the roof 38 is supported upon and guided by a power arm 46 and a control link 48 having their opposite ends pivoted respectively to the main roof section 40 and to the vehicle frame. The roof and rear deck lid are operated in timed relationship from a single power source so that the rear deck lid is automatically opened to receive the roof and is thereafter closed when the roof has reached its final stored position within the body. The opening between the forward edge of the rear deck lid 44 and the upper portion of the rear seat 36 is closed by a hinged shelf 50 having pivoted end flaps 52 and arranged to be automatically opened and closed to provide clearance for the operation of the roof mechanism yet to form a rigid trim cover for this space when the roof is completely stored.

Reference is now made to the fragmentary perspective view shown in Figure 5, and to the side elevational views shown in Figures 6, 7 and 8 in which several sequential positions of the mechanism are shown during the cycle thereof between the raised and lowered positions of the roof. The mechanism and structure at each side of the vehicle is the same, and consequently only one side will be illustrated and described in detail.

As seen in Figures 6 and 11, the power arm 46 is pivotally connected by means of a pivot stud 54 to a bracket 56 rigidly mounted upon the vehicle underbody at the side of the side frame rail 58. The frame rail 58 is of box section and supports underbody panels 60 and 62 which are welded together and which in turn support a Z-shaped reinforcing member 64, the latter being welded to the underbody structure. The mounting bracket 56 is secured to the reinforcing member 64 by means of bolts 68, and rotatably carries the pivot stud 54 for the power arm 46. Slots 72 are formed in the reinforcing member 64 to permit adjustment of the mounting bracket 56 to compensate for manufacturing variations and to permit the roof 38 to be adjusted to provide a proper fit with the vehicle body. The wheelhouse 74 is secured to the underbody panel 62 at the outboard side of the mounting bracket 56 and the power arm 46.

The upper portion of the power arm 46 extends within the rear quarter of the roof 38 and its end portion is bent forwardly and pivotally connected at 76 to a bracket 78 carried by the main roof section 40 on the inboard side of the rear quarter 80 thereof. It will be understood that a complementary power arm 46 is provided at the opposite side of the vehicle to support and guide the opposite side of the roof.

A control link 48 is also provided at each side of the vehicle, and is pivotally connected at its upper end at 82 to a supporting bracket 84 carried by the main roof section 40 adjacent the lower portion of the rear quarter 80 thereof. The lower end of the control link 48 is pivotally connected to a moveable fulcrum stud 86. As best seen in Figures 6 and 12, the moveable fulcrum stud 86 is rotatably mounted in bushings 88 carried in the lower end of a pivot strut 90, the upper end of which is pivotally connected by means of a stud 92 to an upstanding flange 94 formed on an angle-shaped bracket 96 adjustably mounted upon the vehicle. Intersecting slots 98 and 100 are formed in the bracket 96 and the reinforcing member 64 respectively to receive bolts 102 which extend through the underbody panel 60 and engage a nutplate 104 to clamp the bracket 96 thereto. The slots 98 and 100 permit adjustment of the bracket to properly align the portions of the mechanism and the roof to compensate for manufacturing variations and to provide a proper fit therefor.

As seen in Figure 12, the fulcrum stud 86 pivotally connects the lower portion of the control link 48 to the pivot strut 90 and also forms a connection for a control rod 106 which extends rearwardly therefrom into and through a guide housing 108. The housing 108 is secured to the under body structure 62 and has an end flange 110 to which the rearward end of the control rod 106 extends. A coil spring 112 surrounds the control rod 106 between a washer 114 carried at the forward portion thereof and the rear wall 110 of the guide housing 108. The housing 108 thus serves to guide the control rod and to protect the coil spring. The coil spring 112 is assembled under sufficient compression to normally hold the pivot strut 90 in the position shown in Figures 6 and 7 so that during the major portion of the retractile movement of the roof the fulcrum 86 occupies a fixed predetermined position. As will be described more in detail hereinafter, the final closing movement of the roof results in a rearward movement of the fulcrum 86.

As best seen in Figures 5 and 6, power actuation of the aforesaid linkage as well as of the rear deck lid 44 is achieved by means of a single electric motor 116 mounted in a fixed position centrally of the vehicle body upon the underbody structure thereof. Through a gear reduction 118 the motor 116 drives a pair of flexible shafts 120 and 122 extending transversely toward opposite sides of the vehicle and then curved rearwardly. At its rearward end each flexible shaft is operatively connected to a gear box 124 mounted upon the frame reinforcement 64 and here shown as comprising a drive gear of the spur gear type. Each gear box 124 drives a longitudinally extending actuating screw 126 through the medium of a universal joint 128. The forward portion of the actuating screw 126 is telescopically received within a tubular drive strut 130 supporting at its rearward end a ball nut 132.

At its forward end the tubular drive strut 130 is pivotally connected to the return bent flange 131 of a drive strut link 134. The opposite end of the drive strut link 134 is pivotally connected at 136 to an intermediate portion of the main power arm 46. A swing link 138 is pivotally connected at 140 to a bracket 142 carried by the frame reinforcing member 64, and at its opposite end is pivotally connected at 143 to the drive strut link 134 in alignment with the pivotal connection between the tubular strut 130 and the drive strut link 134. The swing link 138 guides the forward end of the tubular drive strut 130 in an arcuate path as the tubular drive strut and the actuating screw are telescopically moved relative to each other during the raising or lowering of the vehicle roof. An advantageous power angle is thus provided between the drive strut link 134 and the main power arm 46 during the portion of a cycle requiring the greatest applied force to the roof linkage.

The rear deck lid 44 is power driven from the electric motor 116 in timed relationship to the movement of the vehicle roof 38 in such manner as to raise the lid prior to the actuation of the roof to provide clearance for the displacement of the roof into the space beneath the lid, and finally to close the rear deck lid after the roof has been completely stored therebeneath. As best seen in Figures 6, 7, 8 and 13, the rear deck lid 44 is pivotally connected to the vehicle body adjacent its rearward portion by means of brackets 144 and 146 secured respectively to the rear deck lid 44 and to the underbody structure of the vehicle body adjacent each side thereof. Conventional pairs of links 148, 150, 152 and 154 are pivotally connected to each other and to the brackets 144 and 146 to support the rear deck lid for pivotal and bodily movement. A counterbalancing spring 156 is secured between the bracket 146 and the lower end of the link 150 to assist in counterbalancing the weight of the rear deck.

Figure 13:
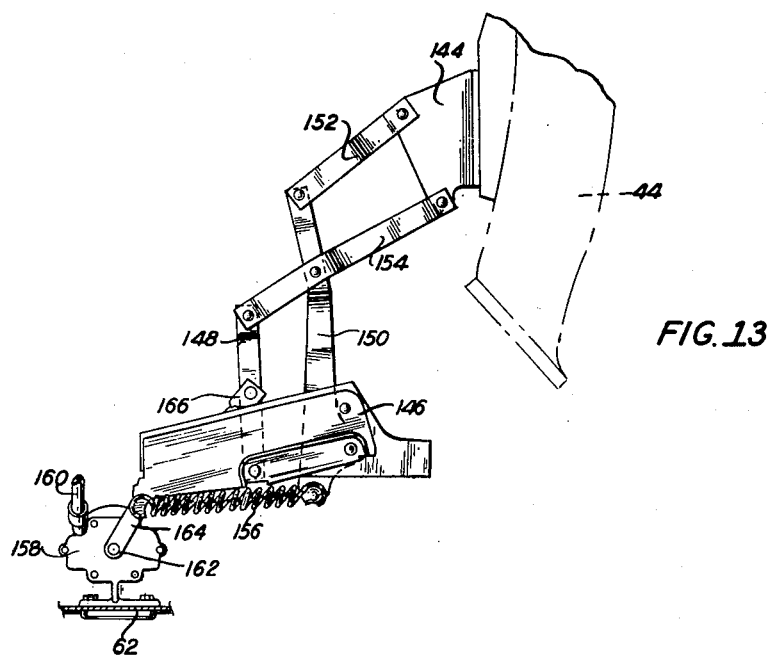
Figure 13 is an enlarged elevational view of the hinge means and drive mechanism for the rear deck lid.
Figure 14:
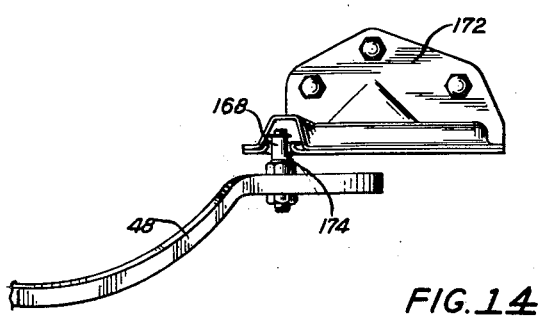
Figure 14 is an enlarged plan view of the guide track adjacent one side of the vehicle body for guiding the final closing movement of the roof.

A separate gear box 158, Figure 13 is provided adjacent each side of the vehicle, being supported upon the underbody panel 62. Each gear box 158 is drivingly connected to the gear box 124 for the power for the roof linkage by means of a drive shaft 160, so as to be driven at all times when the electric motor 116 is operated. The driven shaft 162 of the gear box 158 drives a crank arm 164, the opposite end of which is connected by means of a connecting link 166 to an intermediate portion of the hinge link 148 for the rear deck 44. It will be apparent that a complete revolution of the driven shaft 162 of the gear box 158 results in a complete cycle for the rear deck 44, moving the latter from a closed position to a fully opened position and returning it to its closed position. During this interval the roof 38 is moved from its raised position to its lowered position, or, in the case of the roof being raised is moved from its stored to its fully raised position.

Mention was made earlier in the description of the fact that the moveable fulcrum stud 86 pivotally supporting the lower end of the control link 48 is normally held in a fixed predetermined position by means of the control rod 106 and the coil spring 112 during the major portion of the retractile movement of the roof. When the main roof section 38 reaches the position shown in Figure 7, in which its retractile movement is nearly completed, a projecting guide stud 168, mounted upon the control link 48 adjacent its pivotal connection 82 to the roof, engages a guide flange 170 integrally formed at the forward upper portion of a guide bracket 172 secured to the underbody panel 62 of the vehicle body adjacent each side of the rearward portion of the latter. The guide bracket 172 is formed with a downwardly inclined guide track 174 to receive the guide stud 168. It will be noted that in the position of the parts shown in Figure 7, the guide stud 168 rests upon the guide flange 170 of the bracket immediately adjacent the entrance to the track 174.

Referring now to Figure 7 and 8, further operation of the actuating screws 126 apply a rearward force to the tubular drive struts 130 and a downward and rearward force to the drive strut links 134. This results in pivoting the roof 38 in a counterclockwise direction and at the same time in forcing the control link 48 and the rearward portion of the rear quarter 80 of the main roof section 40 in a rearward direction. The interconnection between the drive stud 168 carried by the control link 48 and the guide track 174 in the fixed bracket 172 accurately guides the rearward portion of the roof into its final stored position as approximately shown in Figure 8. This necessitates a rearward movement of each control link 48 and this is accomplished by swinging movement of the pivot strut 90 about its pivotal connection 92 to the vehicle to move the moveable fulcrum 86 longitudinally rearwardly and to compress the coil spring 112 surrounding the control rod 106.

It will be seen that this action cushions the final retractile movement of the top to provide a smooth operation, and in addition accurately guides the top into the restricted space available so that the top will occupy a predetermined exact location and will not interfere with other components of the vehicle. The retractile movement of the top thus comprises first a parallelogram bodily movement and then a final counterclockwise pivotal movement about the pivotal connection 76 between the power arm 46 and the top. Full utilization of the available space in the rearward portion of the vehicle body is thus obtained, and the rearward portion of the main roof section 40 is nestled beneath and immediate adjacent the generally vertical stationary back body panel 176. While this portion of the mechanism could be eliminated and an operative structure still obtained, it would be necessary to lengthen the vehicle body to provide the additional space required to complete the retractile movement of the roof.

A flat counterbalancing spring 178 is provided adjacent each side of the vehicle, with its forward end secured by bolts 180 to the underbody reinforcing member 64. The free position of the flat spring 178 is shown in Figure 7 since during the intermediate portion of the retractile movement of the roof the spring is out of engagement with the power arm 46 and the control link 48. In the fully raised position of the roof as shown in Figure 6, however, the rearward end 182 is engaged by the lower end of the control link 48 to move the spring downwardly and to provide an initial assist to the movement of the roof linkage when the control is operated to lower the roof. Also, in the closed position of the roof as shown in Figure 8, the rearward end 182 of the flat spring 178 is engaged by an intermediate portion of the power arm 46, to further cushion the final movement of the linkage and to provide an automatically operated assist to the initial raising movement of the roof when the control is operated to again raise the roof from its stored position.

Means are provided to automatically fold the forward roof section 42 beneath the main roof section 40 during the retractile movement of the roof, to thereby shorten the over-all stored length of the roof and to enable it to be compactly arranged within the available space. This means includes a two section rod 184 adjustably interconnected by means of a threaded connector 186, the lower end of the rod 184 being pivotally connected at 188 to an upstanding ear 190 integrally formed on the forward end of the main power arm 46. The opposite end of the rod 184 is connected to one end of a bell crank lever 192 pivotally supported intermediate its ends upon a bracket 194 carried by the main roof section 40. The opposite arm of the bell crank lever 192 is pivotally connected to the rearward end of a connecting link 196, the forward end of which is pivotally connected to an elongated somewhat U-shaped lever 198. The lever 198 is pivotally supported at 200 to the forward portion of the main roof section 40 and its opposite end is pivotally connected at 202 to the rearward portion of the forward roof section 42. An idler link 204 is provided, with its opposite ends being pivotally connected to the adjacent portions of the main roof section 40 and forward roof section 42.

The construction is such that, as the main power arm 46 is operated by the power means hereinbefore described, its relative rotation with respect to the main roof section 40 about the pivotal axis 76 results in rearward movement of the rod 184 and forward movement of the connecting link 196 to rock the lever 198 about its axis 200 and to cause the forward roof section 42 to progressively fold beneath the main roof section 40 as the roof is lowered.

As best seen in Figure 10, the lateral side edges of the main roof section 40 are supported by a longitudinally extending roof rail having an outer roof rail section 206 and an inner roof rail section 208. A roof rail section 210 is carried between the sheet metal sections 206 and 208 and combines therewith to form a rigid strong structure. A channel 212 is formed in the roof rail to provide clearance for the operation of the connecting rod 196. In the portion of the roof rail shown in Figure 9, the rail is divided into an outboard section 214 and an inboard section 216 to provide clearance therebetween for swinging movement of the elongated generally U-shaped lever 198. As shown, the lever 198 is pivotally connected at its lower end to a bracket 217 secured to the outboard roof rail section 214 and at its opposite end is pivotally connected by means of the stud 218 to the eye 220 formed at the forward end of the connecting rod 196.

It will be understood that the invention is not to be limited to the exact construction shown and described, but that various changes and modifications may be made without departing from the spirit and scope of the invention, as defined in the appended claims.

What is claimed is:

1. In a motor vehicle body having a generally horizontally extending rear deck lid pivotally connected to the body at its rearward end and providing a storage space therebeneath, a vehicle roof having a main rigid metal roof section and a smaller forward rigid metal roof section forming a continuation of the main roof section in the raised position of the roof, a bell crank lever pivotally connected at one end to the forward roof section and intermediate its ends to the main roof section adjacent the forward end of the lever, said bell crank lever having an integral arm extending on the opposite side of its pivotal connection to said main roof section from the body portion of the bell crank lever, an idler link having its opposite ends pivotally connected to said main roof section and to said forward roof section adjacent their interconnection, a link pivotally connected at its forward end to the projecting arm of said bell crank lever and extending longitudinally along the main roof section, a second bell crank lever pivotally connected to said main roof section intermediate its ends and having one arm thereof pivotally connected to the rearward end of said link, a pair of roof supporting arms at each side of the vehicle having their upper ends pivotally connected to said main roof section and their lower ends pivotally supported upon said vehicle, one of the roof supporting arms at each side of the vehicle having an offset portion formed adjacent its pivotal connection to the main roof section, and another link having its opposite ends pivotally connected to the second arm of said second bell crank lever and to the offset portion of said roof supporting arm to effect a pivotal movement of said forward roof section relative to said main roof section as the main roof section is lowered into the space beneath said rear deck lid to shorten the over-all length of said vehicle roof in the stored or lowered position thereof.

2. The structure defined by claim 1 which is further characterized in that the roof supporting arm to which said other connecting link is pivotally connected is adjustably connected to the vehicle to permit longitudinal adjustment thereof, and said other connecting link is formed in two telescopically arranged and adjustable sections to permit adjustment between said main roof section and said forward roof section.

3. In a motor vehicle body having a rear deck lid pivotally connected to said body adjacent its rearward end and providing a storage space therebeneath, a rigid metal roof retractable between a normal raised position and a stored position in said storage space, a pair of roof supporting arms at each side of the vehicle, one of said arms being pivotally connected at its lower end to said vehicle body and at its upper end to said roof, the other of said arms being pivotally connected at its upper end to said roof at a point spaced longitudinally rearwardly of the pivotal connection of said first mentioned arm to the roof, a swinging link pivotally connected to said vehicle body for pivotal movement about a transverse horizontal axis, means pivotally connecting the lower end of said second mentioned arm to said swinging link, spring means normally urging said swinging link forwardly to a fixed predetermined position to form a fulcrum for said second mentioned arm fixed during the initial and intermediate portions of the retractile movement of the roof, and power means connected to said first mentioned arm to retract the roof, said power means being arranged to overcome said spring during the final retractile movement of the roof to move said fulcrum between the second mentioned arm and the swinging link rearwardly.

4. The structure defined by claim 3 which is further characterized in that a guide track is mounted upon the vehicle body adjacent the rearward portion thereof at each side of the body, said second mentioned arm having a guide pin supported thereby engageable with said guide track during the final retractile movement of said roof to guide the latter into a fixed predetermined stored position within the storage space provided beneath said rear deck lid.

5. In a motor vehicle body having a rear deck lid extending generally horizontally at the rearward portion of said body and pivotally connected at its rearward portion to said body to provide an accessible storage space in the rearward portion of said body beneath said lid, a longitudinally extending frame supporting member within said storage space adjacent each side of the vehicle, a pair of supporting brackets mounted upon each of said frame supporting members at longitudinally spaced points, a retractable rigid metal roof for said vehicle body, a power arm pivotally connected at its lower end to one of the brackets at each side of the vehicle and pivotally connected at its upper end to the retractable roof, a control arm pivotally connected at its upper end to said retractable roof at a point spaced rearwardly of the pivotal connection of said power arm to said roof, a swinging link pivotally connected to the second bracket at each side of the vehicle and depending downwardly therefrom, means pivotally connecting the lower end of said swinging link to the rearward end of said control arm, spring means acting upon the pivotal connection between said swinging link and said control arm to normally urge said pivotal connection forwardly to a fixed predetermined position, power actuated means connected to said power arm intermediate the ends of the latter to bodily retract said rigid roof into said storage space, said spring means during the initial and intermediate portions of said retractile roof movement holding the pivotal connection between the swinging link and control arm in its forward position, said spring means being arranged to be overridden by the final power actuated retractile movement of the roof to permit said swinging link to swing rearwardly to effect a bodily rearward movement of said rigid roof during its final retractile movement.

6. The structure defined by claim 5 which is further characterized in that said spring means comprises a rod connected to the pivotal connection between the swinging link and the control arm, a guide bracket on said frame supporting member forming a guide for said rod, a coil spring encircling said rod between said pivotal connection and said bracket, and guide means at the rearward end of said storage space at opposite sides of the vehicle engageable with a portion of said control arm to guide the final retractile movement of the roof as the swinging link is swung rearwardly against the action of said coil spring.

7. The structure defined by claim 6 which is further characterized in that said guide means comprises a bracket mounted upon said frame supporting member and having a rearwardly and downwardly inclined track formed therein, said guide bracket having an upwardly extending projection adjacent its forward end, and a pivot stud carried by said control arm and guided by said projection into the track in said guide bracket during the final retractile movement of the roof, said guide pin being moveable into said track simultaneously with the compression of said coil spring and the consequent rearward swinging movement of said swinging arm.

8. In a motor vehicle body having a rear deck lid pivotally connected to said body adjacent its rearward end and providing a storage space therebeneath, a rigid metal roof retractable between a normal raised position and a stored position in said storage space, a pair of roof supporting arms at each side of the vehicle, one of said arms being pivotally connected at its lower end to said vehicle body and at its upper end to said roof, the other of said arms being pivotally connected at its upper end to said roof at a point spaced longitudinally rearwardly of the pivotal connection of said first mentioned arm to the roof, movable means pivotally supporting the lower end of said second mentioned arm, spring means acting upon said movable means to hold the latter in a predetermined fixed position relative to said vehicle body during the initial and intermediate portions of the retractile movement of the roof but yieldable to enable said movable means to move rearwardly during the final retractile movement of the roof.

9. The structure defined by claim 8 which is further characterized in that guide means are mounted upon the vehicle body adjacent the rearward portion thereof, and means on the rearward portion of said roof engageable with said guide means during the final retractile movement of the roof to guide the latter to a predetermined stored position within the storage space beneath said rear deck lid.

10. In a motor vehicle body structure having a rear deck lid pivotally connected to said body structure adjacent its rearward end and providing a storage space therebeneath, a rigid metal roof structure retractable between a normal raised position and a stored position in said storage space, a pair of roof supporting arms at each side of the vehicle, one of said arms having pivotal connections to said body structure and to said roof structure at fixed locations on said body and roof structures respectively, the other of said arms having a pivotal connection to one of said structures and a lost motion pivotal connection to the other of said structures, power means for retracting and raising said roof, and means normally holding said arm at one end of the travel permitted by said lost motion connection but movable during the final portion of the retractile movement of said roof structure to permit the forward portion of said roof structure to lower to its stored position under the influence of said power means.

11. The structure defined by claim 10 which is further characterized in that said lost motion connection includes spring means normally holding said arm at one end of the travel permitted by said lost motion connection, said power means being arranged to overcome said spring means during the final portion of the retractile movement of said roof structure to enable said roof structure to fulcrum about the pivotal connection between said one arm and said roof structure.

12. In a motor vehicle having a body and a frame support, a retractable metal roof for said body, a pair of arms at each side of said body for supporting said roof and bodily moving the latter between a raised position and a stored position located rearwardly and downwardly of its raised position, each of said arms being pivotally connected at its upper end to said roof and at its lower end pivotally supported upon said frame support, a power actuating unit for bodily moving said roof in a path determined by said arms, a guide track mounted upon said vehicle body adjacent the rearward portion thereof, and a part operatively connected to the lower rearward portion of said roof engageable with said guide track during the final portion of the retractile movement of the roof to guide the rearward portion of the roof to its final predetermined stored position.

13. In a motor vehicle having a body and a frame support, a retractable metal roof for said body, a pair of arms at each side of said body for supporting said roof and bodily moving the latter between a raised position and a stored position located rearwardly and downwardly of its raised position, each of said arms being pivotally connected at its upper end to said roof and at its lower end pivotally supported upon said frame support, power means for swinging said arms rearwardly through an angle of less than 180 degrees so that said roof is angularly disposed with respect to its raised position, and a longitudinally movable support for the lower end of one of each of said pairs of arms to enable said roof to be swung about its pivotal connections with the other one of each of said pairs of arms to a stored position generally parallel to its raised position.

14. In a motor vehicle having a body and a frame support, a retractable metal roof for said body, a pair of arms at each side of said body for supporting said roof and bodily moving the latter between a raised position and a stored position located rearwardly and downwardly of its raised position, said arms being pivotally supported at their lower ends upon said frame support and extending diagonally forwardly and upwardly in the raised position of the roof and pivotally supported at their upper ends upon the lower rear portion of each side of the roof, power means connected to one of said arms for swinging said arms rearwardly through an angle greater than 90 degrees and less than 180 degrees so that said roof is disposed with its rearward portion substantially in its stored position but with its forward portion substantially higher than its stored position, and a movable support for one end of one of each of said pair of arms which permits the forward portion of said roof to lower to its stored position under the influence of said power means.

15. In a motor vehicle having a body and a frame support, a retractable metal roof for said body having a generally horizontal forward portion and a downwardly extending rearward portion formed with quarter panels at each side thereof, a pair of arms at each side of said body pivotally connected to the adjacent quarter panel at longitudinally spaced points near the lower edge thereof, said arms extending diagonally downwardly and rearwardly and pivotally supported at their lower ends upon said frame support, power means connected to one of said arms for swinging said arms rearwardly through an angle greater than 90 degrees and less than 180 degrees to move said roof to a semiretracted position in which the rearward portion of said roof is lowered to substantially its stored position and the forward portion of said roof is inclined upwardly in a forward direction and is higher than its stored position, and a longitudinally movable support for the lower end of the other of said arms to enable said other arm to be bodily moved longitudinally rearwardly to lower the forward portion of said roof to its stored position.

16. In a motor vehicle having a body and a frame support, a retractable metal roof for said body, a pair of arms at each side of said body for supporting said roof and bodily moving the latter between a raised position and a stored position located rearwardly and downwardly of its raised position, each of said arms being pivotally connected at its upper end to said roof and at its lower end pivotally supported upon said frame support, a power driven telescopic actuating unit at each side of said vehicle and extending longitudinally thereof, means supporting the rearward end of each of said longitudinally extending actuating units upon said frame support for pivotal movement about a horizontal transversely extending axis, a drive strut link at each side of the vehicle having its forward end pivotally connected to the forward end of said telescopic actuating unit and its rearward end pivotally connected to an intermediate portion of one of the roof supporting arms, said drive strut link being generally parallel to said telescopic actuating link in the raised position of said roof, and a supporting link at each side of the vehicle having its rearward end pivotally connected to said frame support and its forward end pivotally connected to the forward end of said drive strut link to support and guide the forward ends of said actuating units during their telescopic driving actuation to enable force to be applied to said roof supporting arms from said actuating units through said drive strut links, said supporting link and said drive strut link extending in the raised position of the roof generally horizontally forward from their pivotal connections to said frame support and said roof supporting arm respectively with the pivotal connection between said supporting link and said frame support being located slightly lower than the pivotal connection between said drive strut link and said roof supporting arm, said links being arranged so that the power driven telescopic movement of said actuating unit to lower said roof applies a force to said drive strut link and said supporting link pivot so that said links operate as a progressively opening toggle.

17. In a motor vehicle having a body and a frame support, a retractable metal roof for said body having a generally horizontal upper portion and downwardly extending side portions adjacent the rearward end thereof, a pair of arms at each side of said body for supporting said roof and bodily moving the latter between a raised position and a stored position located rearwardly and downwardly of its raised position, each of said arms being pivotally connected at its upper end to the lower part of a downwardly depending side portion of said roof and at its lower end pivotally supported upon said frame support, the upper portion of said roof having a main rigid section and a smaller forward rigid section forming a continuation of the main roof section in the raised position of the roof, means pivotally connecting said roof sections together, a crank arm on one of said arms adjacent its pivotal connection to said roof, a lever pivotally mounted upon the side of said roof substantially at the juncture between the generally horizontal upper portion of the roof and the downwardly extending side portion thereof, a link extending upwardly along the inner side of the downwardly depending side portion of said roof and having its opposite ends operatively connected to said lever and to said crank arm, and a second link extending generally horizontally along the upper portion of said roof and having its opposite ends operatively connected to said lever and to the forward section of said roof to fold said forward roof section under the forward portion of said main roof section during the movement of the roof from the raised position to the stored position.

References Cited in the file of this patent

UNITED STATES PATENTS

| | | |
|---|---|---|
| 2,007,873 | Paulin | July 9, 1935 |
| 2,105,293 | Paulin | Jan. 11, 1938 |
| 2,230,140 | Falcon | Jan. 28, 1941 |
| 2,471,378 | Shilala | May 24, 1949 |
| 2,540,454 | Milhan | Feb. 6, 1951 |
| 2,580,487 | Vigmostad | Jan. 1, 1952 |

FOREIGN PATENTS

| | | |
|---|---|---|
| 317,052 | Italy | Apr. 23, 1934 |